United States Patent
Rowell et al.

(12)
(10) Patent No.: US 6,376,007 B1
(45) Date of Patent: Apr. 23, 2002

(54) METHOD OF MARKING GLASS

(75) Inventors: Charles A. Rowell, Tempe; David W. Jacobs, Mesa; Edward A. Zarbock, Gilbert, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/585,213

(22) Filed: Jun. 1, 2000

(51) Int. Cl.$^7$ ............................. B05D 1/28; B05D 5/12
(52) U.S. Cl. ......................... 427/11; 427/64; 427/68; 427/77; 427/108; 427/123; 427/126.1; 427/266; 427/287
(58) Field of Search ................... 427/11, 64, 68, 427/69, 77, 108, 123, 126.1, 266, 286, 287, 242

(56) References Cited

U.S. PATENT DOCUMENTS

| | | | | |
|---|---|---|---|---|
| 3,956,528 A | * | 5/1976 | Ugro, Jr. ................... | 427/125 |
| 4,143,180 A | * | 3/1979 | White ........................ | 427/145 |
| 5,980,998 A | * | 11/1999 | Sharma et al. .............. | 427/559 |
| 6,169,357 B1 | * | 1/2001 | Potter ....................... | 313/495 |

* cited by examiner

Primary Examiner—Shrive P. Beck
Assistant Examiner—Jennifer Kolb Michener
(74) Attorney, Agent, or Firm—Kevin D. Wills; William E. Koch

(57) ABSTRACT

A method of marking glass includes providing a glass material with a surface (201) and using a wire (210) to mark the surface. The wire is softer than the glass material and does not damage the surface of the glass material.

21 Claims, 1 Drawing Sheet

METHOD OF MARKING GLASS

FIELD OF THE INVENTION

This invention relates, in general, to manufacturing techniques using glass substrates, and more particularly, to methods of marking glass.

BACKGROUND OF THE INVENTION

Glass substrates are used as support substrates in fabricating cathodes for field emission devices. The glass substrates need to be identified by a unique mark so that the glass substrates can be distinguished from each other. Several marking techniques exist, but the techniques have many disadvantages.

For example, one technique for marking a glass substrate uses a diamond scribe to engrave a surface of the glass substrate. However, this engraving process forms grooves in the substrate and also creates many small glass particles, which produces contamination and cleaning problems. Additionally, this engraving process weakens the glass substrate, which may fracture. Furthermore, reliability concerns prohibit forming a glass frit seal over the engraved portions of the glass substrate. Therefore, the portion of the glass substrate used for identification purposes cannot also be used in field emission devices, which increases the cost of the devices.

As another example, a different technique for marking a glass substrate uses a metal-filled ink. In this technique, a writing utensil applies the ink to the surface of the glass substrate. However, this technique additionally requires a high temperature step to set and fuse the ink onto the surface of the glass substrate. Therefore, this technique also increases the cost and the cycle time of the manufacturing process for the field emission devices.

Accordingly, a need exists for a method of marking glass that is non-destructive, does not weaken the glass, does not degrade the reliability of the devices formed over the glass, does not significantly increase the cost of the devices formed over the glass, and does not significantly decrease the throughput of the manufacturing process for the device.

BRIEF DESCRIPTION OF THE DRAWINGS

The invention will be better understood from a reading of the following detailed description, taken in conjunction with the drawing figures in which.

Figure 1:
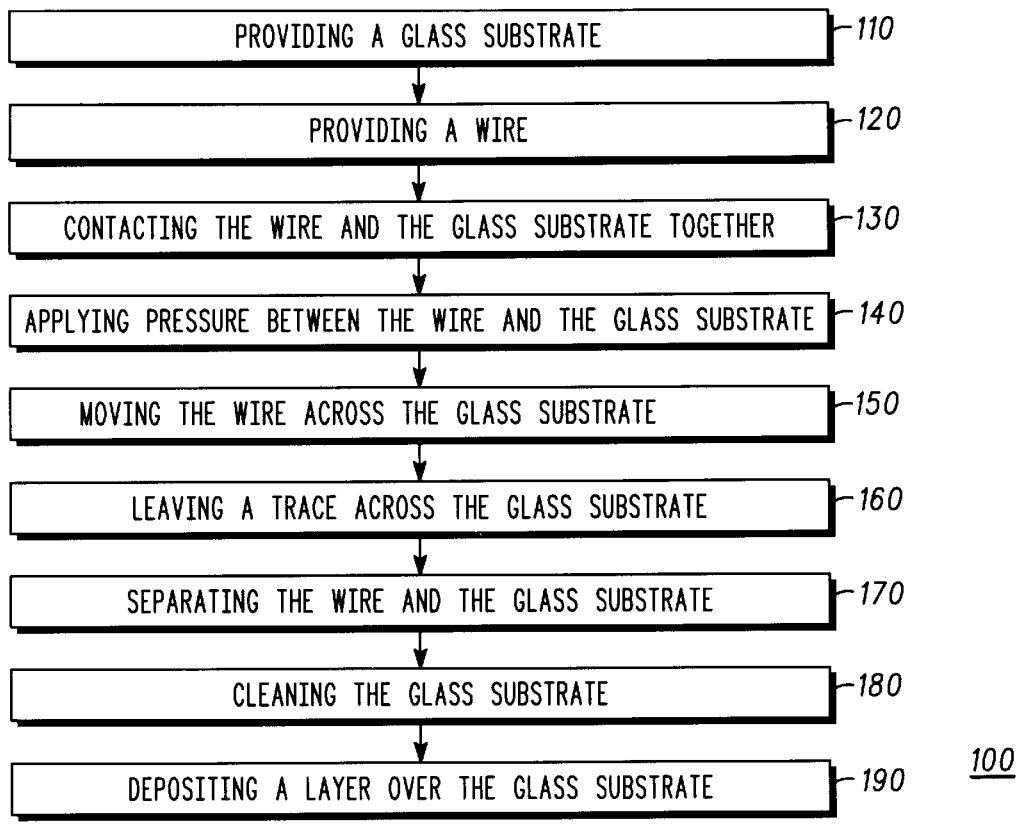
FIG. 1 illustrates a flow chart of a method of marking glass in accordance with an embodiment of the invention.

For simplicity and clarity of illustration, the drawing figures illustrate the general manner of construction, and elements in the drawing figures are not necessarily drawn to scale. Additionally, the same reference numerals in different figures denote the same elements, and descriptions and details of well-known features and techniques are omitted to avoid unnecessarily obscuring the invention.

Furthermore, the terms over, under, and the like in the description and in the claims, if any, are used for descriptive purposes and not necessarily for describing relative positions. It is understood that the terms so used are interchangeable under appropriate circumstances.

DETAILED DESCRIPTION OF THE DRAWINGS

FIG. 1 illustrates a flow chart of a method 100 of marking glass. As an example, method 100 can be a portion of a process for manufacturing field emission devices. At a step 110 of method 100, a glass substrate or panel is provided. The substrate has a surface that is preferably substantially planar and that is also preferably substantially smooth. This preferred embodiment of the substrate facilitates the subsequent marking of the substrate.

The substrate is comprised of a glass material. As an example, the glass material can be selected from the group consisting of soda lime glass and borosilicate glass. In the preferred embodiment, the glass material consists of borosilicate glass because of the ability to make field emission devices on borosilicate glass. The borosilicate glass can have a thickness of approximately 0.5 millimeters and greater.

At a step 120 of method 100, a wire is provided. As an example, the wire can have a cylindrical shape with two ends or tips. The wire can have a length of approximately two to three centimeters and a diameter of approximately one millimeter. However, the wire can have other configurations and/or dimensions. Alternatively, the wire can be replaced with a stub approximately two hundred fifty to five hundred micrometers in length and mounted onto a supporting structure. Furthermore, the wire can have a dull tip or a pointed or sharpened tip. A pointed or sharpened tip may permit the formation of smaller markings on the substrate.

As an example, the wire can be comprised of a metal or a metal alloy comprised of the metal that is softer than the glass substrate. Preferably, the metal is resistant to chemical etching by solutions or mixtures that are used to clean glass. The metal is also preferably compatible with a thin film deposition process for reasons explained hereinafter. As an example, the wire can be comprised of zirconium, titanium, molybdenum, or metal alloys of like properties. In the preferred embodiment, the wire consists of reactor grade zirconium, which is softer than soda lime glass and borosilicate glass.

Next, in steps 130, 140, 150, 160, and 170 of method 100, the wire is used to mark the substrate. At step 130 of method 100, the wire and the substrate are contacted together. Step 130 can be performed by moving the wire to contact the surface of the substrate, or the substrate can be moved to contact the wire. Alternatively, both the wire and the substrate can be moved. In the preferred embodiment, a tip of the wire contacts the substantially planar and substantially smooth surface of the substrate. As indicated earlier, the tip of the wire can be dull or pointed. It is not necessary to clean the substrate before performing step 130.

Next, at step 140 of method 100, pressure is applied between the wire and the substrate. The pressure can be applied by moving the wire, moving the substrate, or moving both the wire and the substrate. In the preferred embodiment, step 140 is performed by moving the wire by approximately five to twenty micrometers towards the substrate after contact with the surface of the substrate in step 130.

Then, at step 150 of method 100, the wire moves across the substrate. Step 150 may be performed by moving the wire, by moving the substrate, or by moving both the wire and the substrate. In the preferred embodiment, the tip of the wire is moved, dragged, or rubbed across the substrate. Also in the preferred embodiment, step 150 is performed while continuing to perform step 140. During step 150, the wire can be rotated around an axis along the length of the wire, or the wire can remain non-rotated. Additionally, during step 150, the wire can be positioned and kept substantially orthogonal or perpendicular to the surface of the substrate, or the wire can be positioned and kept non-orthogonal or non-perpendicular to the surface of the substrate.

During step 150, the wire preferably avoids engraving, scoring, or damaging the surface of the substrate to be marked. Accordingly, step 150 does not generate glass particulates and does not weaken the substrate. This feature of step 150 makes method 100 a non-destructive and robust process.

Subsequently, at step 160 of method 100, a trace is left across or over the glass substrate. In the preferred embodiment, step 160 is performed while continuing to perform steps 140 and 150. As an example, the trace can consist of the metal of the wire. The trace forms identification features on the surface of the substrate that can be unique to the substrate. As an example, the trace can form a single alphabetic or numeric character or a plurality of alphabetic and/or numeric characters. As an example, the alphabetic and/or numeric characters can be approximately five to fifty millimeters tall and approximately five to fifty millimeters wide.

At step 170 of method 100, the wire and the substrate are separated from each other. Step 170 can be performed by moving the wire, moving the substrate, or moving both the wire and the substrate. In the preferred embodiment, the wire is removed from the surface of the substrate. The trace of step 160 is kept or remains on the surface of the substrate during and after step 170.

Steps 130, 140, 150, 160, and 170 can be repeated many times to form a desired marking on the surface of the substrate. Alternatively, steps 130, 140, 150, 160, and 170 can each be performed a single time to form the desired marking on the surface of the substrate.

In the preferred embodiment, steps 130, 140, 150, 160, and 170 are performed using an engraving system. As an example, the engraving system can be a Vanguard 9200 Engraving Table commercially available from New Hermes, Incorporated of Duluth, Ga. A chuck in this system can be modified to hold the wire or to hold the support coupled to the stub. This tool can be programmed by software to automate the performance of steps 130, 140, 150, 160, and 170. In this system, the substrate is held stationary by a vacuum table, and the wire is not rotated while being moved across the surface of the substrate.

Next, at a step 180 of method 100, the glass substrate having the trace is cleaned. The glass substrate is cleaned after leaving the trace across the substrate and also after separating the wire and the substrate. The cleaning process of step 180 does not remove the trace from the substrate. As an example, when the trace consists of reactor grade zirconium, a glass cleaning solution or mixture comprised of ammonium hydroxide can be used to clean the substrate without removing the trace from the substrate. In this embodiment, ammonium hydroxide is used to clean the substrate because zirconium is substantially resistant to chemical etching by ammonium hydroxide. It is understood that other solutions or mixtures can be used to clean the substrate depending on the composition of the substrate and the composition of the trace.

At a step 190 of method 100, a layer or thin film is deposited over the substrate. Step 190 is performed after step 180 and is also performed while keeping the trace on or over the surface of the substrate. As an example, the layer or film can be comprised of an electrically insulating material or a dielectric material such as silicon dioxide or silicon nitride. As an example, a chemical vapor deposition process can be used to deposit the dielectric material. The layer protects the underlying trace from erosion or removal during subsequent processing steps. In the preferred embodiment, the thickness of the layer is limited to keep the trace visible through the layer. As an example, when the layer is comprised of silicon dioxide, the layer can have a thickness of approximately 0.1 to 1.0 micrometers. This small thickness of the layer keeps the trace visible during future processing steps so that the substrate can be uniquely identified.

Figure 2:
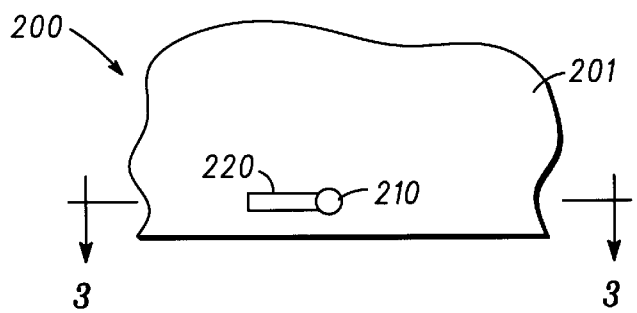
FIG. 2 illustrates a top view of a glass substrate during the method of FIG. 1 in accordance with an embodiment of the invention.
Figure 3:
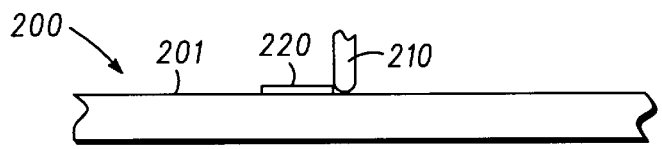
FIG. 3 illustrates a cross-sectional view of the glass substrate of FIG. 2 taken along a section line 3—3 in FIG. 2.

FIG. 2 illustrates a top view of a glass substrate 200 during method 100 of FIG. 1. FIG. 3 illustrates a cross-sectional view of substrate 200 taken along a section line 3—3 in FIG. 2. As illustrated in FIGS. 2 and 3, substrate 200 includes a surface 201 that is preferably substantially planar and substantially smooth. A wire 210 or other similar feature contacts surface 201 of substrate 200. A tip of wire 210 moves across surface 201 to leave a trace 220 on surface 201 of substrate 200.

Figure 4:
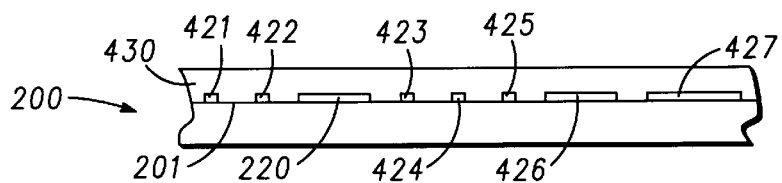
FIG. 4 illustrates a cross-sectional view of the glass substrate after subsequent steps in the method of FIG. 1.

FIG. 4 illustrates a cross-sectional view of substrate 200 after subsequent steps in method 100 of FIG. 1. As illustrated in FIG. 4, a plurality of traces 220, 421, 422, 423, 424, 425, 426, and 427 are located on surface 201 of substrate 200. Additionally, a film or layer 430 overlies or covers surface 201 and plurality of traces 220, 421, 422, 423, 424, 425, 426, and 427.

Therefore, an improved method of marking glass is provided to overcome the disadvantages of the prior art. The method uses pressure and motion between the glass and the wire, resulting in abrasion of the wire to mark the glass in a non-destructive and non-damaging manner. The method does not weaken the glass, does not degrade the reliability of the devices formed over the glass, does not significantly increase the cost of the devices formed over the glass, and does not significantly decrease the throughput for the manufacturing process of the device.

Although the invention has been described with reference to specific embodiments, it will be understood by those skilled in the art that various changes may be made without departing from the spirit or scope of the invention. For instance, the numerous details set forth herein such as, for example, the material compositions are provided to facilitate the understanding of the invention and are not provided to limit the scope of the invention. Accordingly, the disclosure of embodiments of the invention is intended to be illustrative of the scope of the invention and is not intended to be limiting. It is intended that the scope of the invention shall be limited only to the extent required by the appended claims.

What is claimed is:

1. A method of marking glass comprising:
   providing a surface comprised of a glass material;
   providing a wire comprised of a metal softer than the glass material;
   contacting the wire and the surface together;
   marking the glass by leaving a trace comprised of the metal on the surface while avoiding engraving into the surface; and
   removing the wire from the surface.

2. The method of claim 1 further comprising:
   providing the metal to be resistant to chemical etching by a glass cleaning mixture.

3. The method of claim 1 further comprising:
providing the wire to be comprised of a metal alloy comprised of the metal, wherein:
the metal alloy is softer than the glass material.

4. The method of claim 1 further comprising:
providing zirconium for the metal.

5. The method of claim 1 further comprising:
depositing a layer over the surface and over the trace.

6. The method of claim 5 further comprising:
cleaning the surface after leaving the trace and before depositing the layer.

7. The method of claim 5 wherein:
depositing the layer further comprises depositing the layer to a thickness through which the trace is visible.

8. The method of claim 1 wherein:
using the wire further comprises rotating the wire while using the wire to leave a trace, thus marking the glass.

9. The method of claim 1 wherein:
using the wire further comprises keeping the wire non-rotated while using the wire to mark the glass.

10. The method of claim 1 wherein:
using the wire further comprises positioning the wire substantially orthogonal to the surface while using the wire to mark the glass.

11. The method of claim 1 wherein:
using the wire further comprises positioning the wire non-orthogonal to the surface while using the wire to mark the glass.

12. A method of manufacturing a field emission device comprising:
providing a substrate comprised of a glass and having a surface;
providing a wire comprised of zirconium;
contacting the wire and the surface of the substrate together;
leaving a trace comprised of the zirconium on the surface of the substrate thus marking the surface of the substrate while avoiding engraving into the surface of the substrate; and
removing the wire from the surface of the substrate.

13. The method of claim 12 further comprising:
cleaning the surface of the substrate while keeping the trace on the surface of the substrate; and
depositing a dielectric layer over the surface of the substrate and over the trace.

14. A method of marking glass comprising:
providing a glass substrate with a substantially planar surface;
providing a wire consisting of reactor grade zirconium;
moving the wire to contact the substantially planar surface of the glass substrate;
applying pressure from the wire to the substantially planar surface of the glass substrate;
dragging the wire across the substantially planar surface of the glass substrate while avoiding engraving into the surface of the glass substrate;
leaving a trace consisting of the reactor grade zirconium on the substantially planar surface of the glass substrate thereby leaving a marking on the planar surface of the glass substrate; and
removing the wire from the substantially planar surface of the glass substrate.

15. The method of claim 14 wherein:
dragging the wire across the substantially planar surface of the glass substrate occurs while applying the pressure from the wire to the substantially planar surface of the glass substrate; and
removing the wire from the substantially planar surface of the glass substrate further comprises keeping the trace on the substantially planar surface of the glass substrate.

16. The method of claim 15 further comprising:
keeping the wire non-rotated while dragging the wire across the substantially planar surface of the glass substrate; and
keeping the wire substantially perpendicular to the substantially planar surface of the glass substrate while dragging the wire across the substantially planar surface of the glass substrate.

17. The method of claim 16 wherein:
providing the wire further comprises providing the wire with a dull tip;
moving the wire to contact the substantially planar surface of the glass substrate further comprises contacting the dull tip of the wire to the substantially planar surface of the glass substrate;
applying pressure from the wire to the substantially planar surface of the glass substrate further comprises applying pressure from the dull tip of the wire to the substantially planar surface of the glass substrate; and
dragging the wire across the substantially planar surface of the glass substrate further comprises dragging the dull tip of the wire across the substantially planar surface of the glass substrate.

18. The method of claim 14 wherein:
providing the glass substrate further comprises providing the substantially planar surface of the glass substrate to be substantially smooth; and
dragging the wire across the substantially planar surface of the glass substrate further comprises keeping the substantially planar surface of the glass substrate substantially smooth.

19. The method of claim 14 further comprising:
after removing the wire from the substantially planar surface of the glass substrate, cleaning the substantially planar surface of the glass substrate while keeping the trace on the substantially planar surface of the glass substrate; and
after cleaning the substantially planar surface of the glass substrate, depositing an electrically insulative layer over the substantially planar surface of the glass substrate and over the trace while keeping the trace on the substantially planar surface of the glass substrate.

20. The method of claim 19 wherein:
cleaning the substantially planar surface of the glass substrate further comprises applying ammonium hydroxide to the substantially planar surface of the glass substrate and to the trace; and
depositing the electrically insulative layer further comprises using a chemical vapor deposition process to deposit a silicon dioxide layer.

21. The method of claim 14 wherein:
providing the glass substrate further comprises providing a material for the glass substrate selected from the group consisting of soda lime glass and borosilicate glass.

* * * * *